United States Patent [19]

Latter et al.

[11] 4,226,294
[45] Oct. 7, 1980

[54] ENGINE SYSTEM USING LIQUID AIR AND COMBUSTIBLE FUEL

[75] Inventors: Albert L. Latter, Marina del Rey; R. Philip Hammond; James L. Dooley, both of Santa Monica, all of Calif.

[73] Assignee: R & D Associates, Marina del Rey, Calif.

[21] Appl. No.: 958,056

[22] Filed: Nov. 6, 1978

[51] Int. Cl.³ .................. B60K 3/02; F01K 25/06
[52] U.S. Cl. .................. 180/54 B; 60/39.18 C; 60/651; 180/304
[58] Field of Search .............. 180/54 B, 302, 303, 180/301, 304; 60/651, 659, 668, 679, 681, 39.18 C

[56] References Cited

U.S. PATENT DOCUMENTS

| | | | |
|---|---|---|---|
| 1,013,528 | 1/1912 | Broderick | 180/303 |
| 2,482,819 | 9/1949 | Williams | 60/39.18 C |
| 2,483,073 | 9/1949 | Strub | 60/39.18 C |
| 3,257,806 | 6/1966 | Stahl | 60/36 |
| 3,339,663 | 9/1967 | Anderson | 180/304 |
| 3,451,342 | 6/1969 | Schwartzman | 60/651 |
| 3,531,933 | 10/1970 | Baldwin | 60/651 |
| 3,589,126 | 6/1971 | Zotto | 60/36 |
| 3,613,385 | 10/1971 | Hogan et al. | 60/651 |
| 3,826,096 | 7/1974 | Hrusch | 60/709 |
| 3,830,326 | 8/1974 | Hartung | 180/303 |
| 3,987,632 | 10/1976 | Peroda | 60/671 |
| 3,998,059 | 12/1976 | Randell | 60/659 |

FOREIGN PATENT DOCUMENTS 2402557 7/1975 Fed. Rep. of Germany ............ 60/651

Primary Examiner—David M. Mitchell
Attorney, Agent, or Firm—Poms, Smith, Lande & Rose

[57] ABSTRACT

An automobile engine runs on liquid air and gasoline. The liquid air is initially pumped up to a high pressure such as 200 atmospheres (or 200 bars) and is then warmed toward the ambient temperature in a heat exchange and changes to the gaseous state. Subsequently, it is permitted to expand, doing useful work on a piston or other known type of expansion engine. The gas is then passed through an additional heat exchanger where heat is absorbed from the ambient, and is combined with a small amount of fuel such as gasoline. The gasoline is ignited, under constant volume conditions thereby bringing the pressure back up to approximately 200 bars and at a temperature in the order of 1200 degrees. The gas is then allowed to expand in a cylinder containing an additional piston, and as a final cycle, additional fuel is added and ignited, and the resultant gases expand to drive an additional piston and provide further power to the engine. The pistons may all be coupled together to supply power to a single output drive shaft in the manner of an air motor. The exhaust gases are employed to warm the high pressure liquid air in a counter-current heat exchanger where exposure to moist ambient air would cause excessive ice buildup.

16 Claims, 6 Drawing Figures

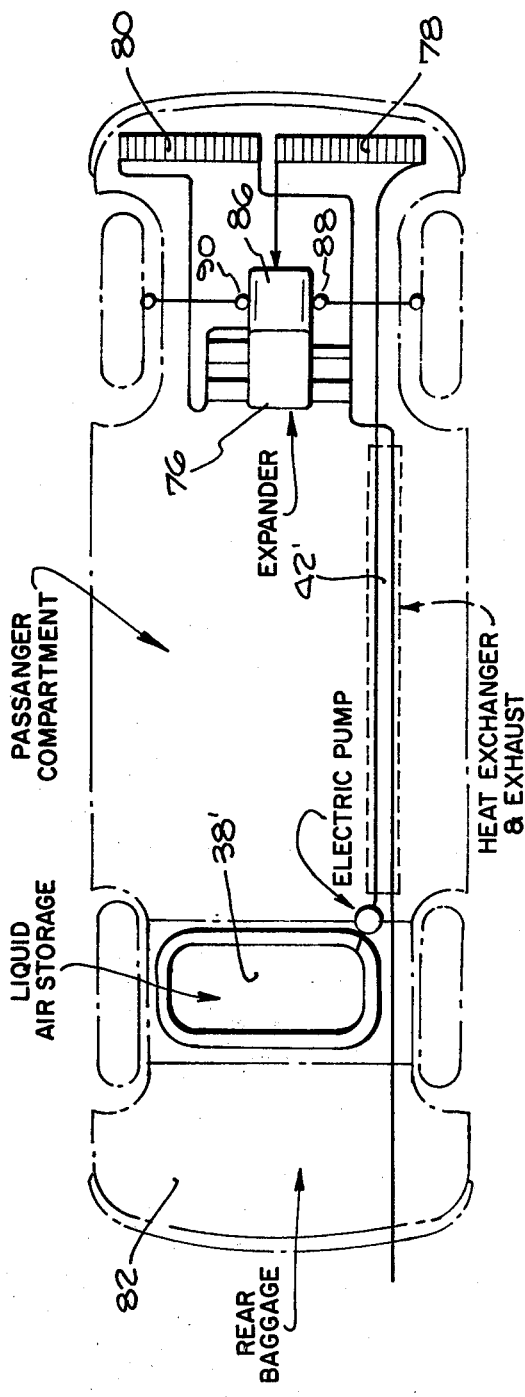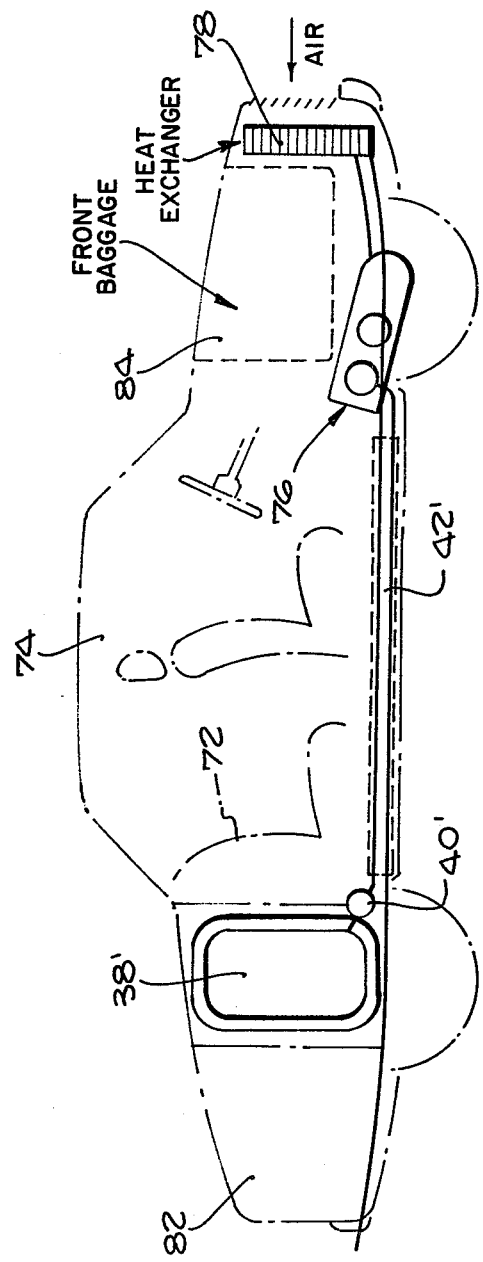

ENGINE SYSTEM USING LIQUID AIR AND COMBUSTIBLE FUEL

FIELD OF THE INVENTION

This invention relates to engines operating on liquified gas.

BACKGROUND OF THE INVENTION

It has previously been proposed to store energy in the form of a liquified gas, such as liquid nitrogen or liquid oxygen. Either of these liquids or their natural mixture, liquid air, can be stored and transported in a well-insulated vessel carried on an automobile. Energy may be recovered from use from this liquified gas by three simple steps:

1. Pressurization of the liquid to a high pressure by pumping.
2. Vaporization of the cold liquid and heating of the gas with air from the ambient environment.
3. Expansion of the gas from high pressure to atmospheric pressure in an appropriate engine expander.

As noted above, the foregoing has been previously proposed, but the results are so poor that it is of little use of ordinary transportation. A heavy load of liquified gas is required for any reasonable range and the cost is unacceptably high. However, the system does have a number of favorable features including low pollutant levels, and the fact that hydrocarbon fuels are not directly consumed.

Accordingly, a principal object of the present invention is to improve the efficiency and range of automobiles and other engines operating on liquified gas, so that they are competitive with conventional internal combustion engines.

SUMMARY OF THE INVENTION

In accordance with the present invention, a composite engine cycle is used which employs a special temperature topping cycle, using any convenient fuel such as gasoline, after taking as much isothermal expansion as is practical. In this new composite cycle, the liquified gas is first pumped to high pressure and warmed by heating with atmospheric air as in prior systems, and is partially expanded, after which it is reheated and expanded partially again several times, thus approaching isothermal expansion. At the point where it is not practical to continue this process, the gas is heated to a higher temperature at constant volume with an external heat source, or by the internal burning of a small amount of injected fuel with the oxygen available from the liquid air. This heat injection raises the pressure to the point where the gas can be expanded adiabatically down to atmospheric pressure with the exhaust temperature in the order of ambient temperature. This process not only enables us to get more energy from the cold gas, but also uses the heat energy injected by the fuel in a more efficient manner.

It is to be understood that various combinations of gas expansion without fuel being added, and two or more cycles of heating gas by the addition of combustion fuel, may be employed.

The resulting engine can thus achieve a more acceptable mileage on the cryogenic liquid and a truly phenomenal mileage on the combustible fuel, in accordance with the analysis set forth in the body of the present specification. The combined cost of these two consumables in the new engine cycle is thereby reduced to a level of practical interest.

The present invention has the following advantages:

1. It greatly extends the mileage attainable on fossil fuel.
2. It reduces dependence on imported oil
3. It may utilize a wide variety of types of fuels.
4. The liquid gas or air consumable can be "recharged" at reasonable cost anywhere there is electric power and a cryostat available.
5. There is no liquid air distribution problem, as it can be readily made from the atmosphere anywhere.
6. The exhaust from the power plant is exceptionally cool and clean—well within all proposed legal limits, without the need for catalytic converters or the like.

Other objects, features, and advantages of the invention will become apparent from a consideration of the following detailed description and from the accompanying drawings.

BRIEF DESCRIPTION OF THE DRAWINGS

FIGS. 4 and 5 are diagrammatic showings of a conventional passenger automobile equipped with an engine in accordance with the principles of the inventions.

DETAILED DESCRIPTION

Figure 1:
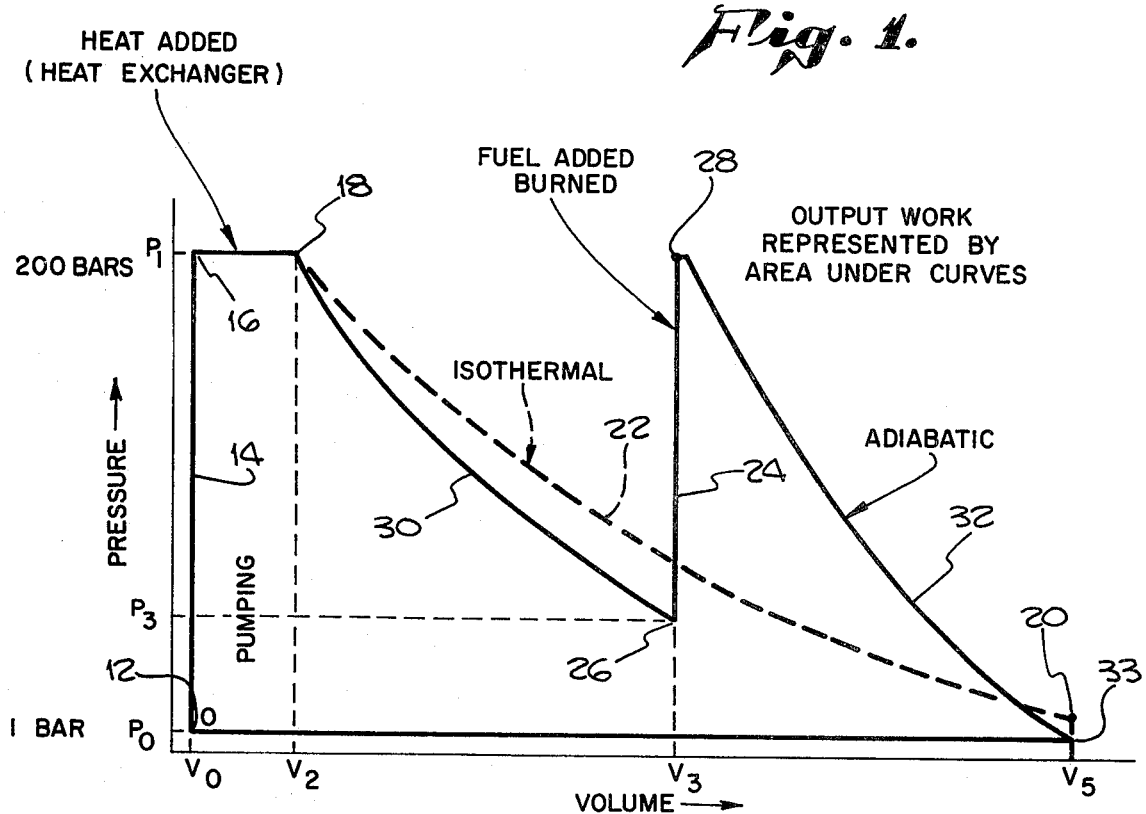
FIG. 1 is a simplified typical theoretical pressure-volume diagram illustrating the principles of the present invention.

Referring more particularly to the drawings, FIG. 1 is a pressure-volume diagram which provides a general comparison of the mode of operation of the apparatus of the type of the present invention, as compared with prior known engines operating with initially cryogenic fluids. More specifically, point 12 in FIG. 1 represents liquid air stored at atmospheric pressure prior to utilization in the engine. Normally the liquid air would be stored in a properly insulated tank, as it is at a temperature in the order of 77° Kelvin (for nitrogen) or 90° Kelvin for oxygen. For reference, on the Kelvin scale, absolute zero is designated "0", and freezing and boiling temperatures for water are approximately 273° K. and 373° K., respectively.

Returning to FIG. 1, the initial step as represented by the line segment 14, extending from starting point 12 to point 16, is to pump the liquid air to an elevated pressure, which may for example be 200 atmospheres, or 200 bars, with little or no change in specific volume. The pressurized liquid air is then passed through a heat exchanger, and the resultant phase change from liquid to gas is represented by the line segment between point 16 and 18 in FIG. 1, involving a volume change.

In comparing what has been previously done with the mode of operation of the apparatus of the present invention, attention is directed to point 20 which is at the far right in FIG. 1. This point represents air at one atmosphere or one bar of pressure, and its volume at a temperature approximating ambient as the expansion from point 18 was along the dashed line 22 isothermally (at constant temperature). Following dashed line 22 implies that ambient heat is added throughout the expansion process. Solid line 30 represnts a more practical expansion which approaches adiabatic conditions where no heat is added during the expansion process.

After expansion along the adiabatic line 30 the gas becomes cold. The present invention involves the addition of heat by the burning of fuel, as represented by the vertical line segment 24, extending between points 26 and 28 in the solid line characteristic of FIG. 1. Accordingly, following an expansion and the accomplishing of useful work as indicated by line segment 30 extending from point 18 to point 26, the initially cryogenic liquid is heated to a temperature well above the ambient, and the pressure is increased to a high pressure such as the 200 bar level of point 16. Additional work is performed by the heated and compressed gas, as indicated by the expansion line segment 32 which extends on to a final point 33 which is at atmospheric pressure and at which temperature is in the order of the ambient.

The work performed by the cryogenic fluid as it expands is represented by the area under the curves. In the case of the present invention, in accordance with one exemplary cycle of operation, the work performed is represented by the area under the curve extending from point 16 to point 18, and then along line segment 30 to point 26, up along line segment 24 to point 28, and then along line segment 32 to point 33.

In a scale graph, the area under the solid line curve 18, 26, 28, 33 including line segments 30 and 32, is much greater than the area lying under curve 22. Further, as set forth quantitatively below, the amount of fuel required to increase the temperature and the pressure of the gas from point 26 to point 28 is relatively small, compared with the additional work which is obtained.

Incidentally, it may be noted that the line segment 30 is designated as being "isothermal", whereas the line segment 32 is designated as being "adiabatic". In the case of an engine which is merely operating on the expansion of compressed gas, the cycle is normally quite rapid in a practical engine, and there is little opportunity for the absorption of heat. Accordingly, the temperature normally drops exponentally proportional to the increase in gas volume. When a cryogenic liquid is employed, and a series of steps are undertaken in the expansion of the gas, with heat exchanger being employed between each successive expansion, the resultant characteristic may be substantially "isothermal". This mode of operation is indicated by the line 30, and it is understood that this might actually be made up of a series of short adiabatic expansions together with the intermediate usage of heat exchangers to increase the temperature of the gas following the adiabatic expansion and resultant cooling of the gas. Incidentally, in considering the plot of FIG. 1, the point 20 might well be at a temperature somewhat below the ambient, because it immediately follows an adiabatic expansion as represented by line segment 32.

Before proceeding to consideration of the implementation of the present invention, it is useful to note the properties of air, and its principal components, nitrogen and oxygen. In this connection, it is noted that air is made up of about 4/5ths nitrogen and 1/15th oxygen with a few minor trace gases which are not of great significance in connection with the present invention. In the following tables, some of the pertinent thermodynamic and other properties of nitrogen, oxygen, and air are set forth.

TABLE I

| | Nitrogen | Air | Oxygen |
|---|---|---|---|
| Symbol | $N_2$ | — | $O_2$ |
| Molecular weight | 28.0 | — | 32.0 |
| Liquid boiling temp, °K. | 77.0 | — | 90.0 |
| Liquid density gm/cm$^3$ | 0.81 | 0.87 | 1.14 |
| Latent heat of vaporization ergs/gm × 10$^9$ | 4.27 | 4.23 | 4.02 |
| Electric power to liquefy (theoretical) kWh/kg | 0.12 | 0.12 | 0.13 |
| kWh/gallon | 0.33 | 0.33 | 0.34 |
| Electric cost at 3 cents kWh and 25% plant efficiency cents/gallon | 3.96 | 3.96 | 4.00 |

From the foregoing table, the liquid boiling temperature of nitrogen and oxygen of 77° Kelvin and 90° Kelvin may be noted. In the centigrade scale, this means that oxygen boils at −183° and nitrogen at −196°; and in the Fahrenheit scale, the respective figures are approximately −297° and −320°. Accordingly, in the storage of these very cold liquids, it is necessary to have well-insulated containers.

Figure 2:
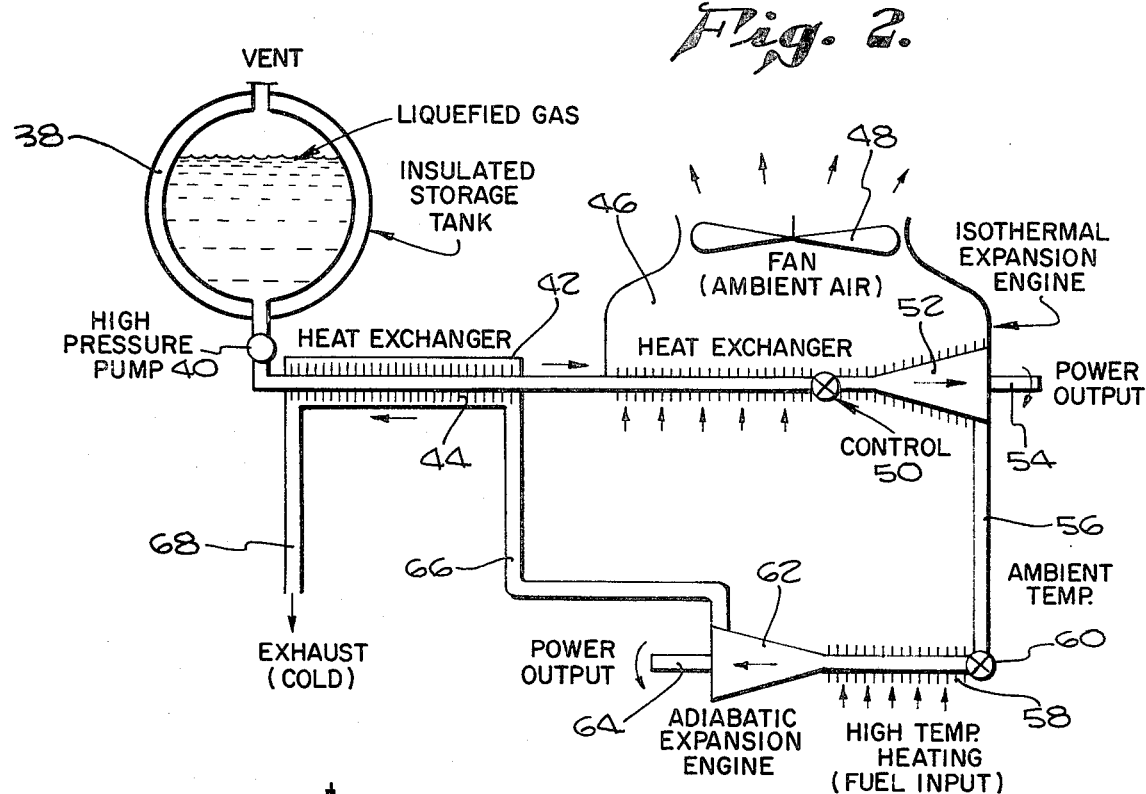
FIG. 2 is a diagrammatic showing of a power plant employing the principles of the present invention.

Now, referring to FIG. 2, in this schematic representation of an engine, the liquified gas is stored in the insulated storage tank 38, and this would correspond to the starting point 12 of the pressure volume plot of FIG. 1. From the tank 38 the liquified gas is pumped up to a high pressure by the pump 40, corresponding to section 14 in the plot of FIG. 1. From the pump 40, the gas passes through a counter flow heat exchanger 42 in which the warm exhaust from the output of the engine is employed to heat up the incoming liquid gas and change it into the gaseous state. The fins 44 in the heat exchanger 42 enhance heat transfer. A larger heat exchanger 46 draws air from the ambient by means of a fan indicated diagrammatically at 48, and further increases the temperature of the gas from the heat exchanger 42. This section of the cycle corresponds to the horizontal line between points 16 and 18 in FIG. 1. Under the control of valving 50, the gas is supplied to an expansion engine 52, which provides power to the output shaft 54. Known types of expansion engines may be employed, with the simplest form being a piston in a cylinder to which the high pressure gas is supplied, with the energy being employed to move the piston and the power take-off mechanisms connected to it.

At the output 56 from the first stage expansion engine 52, the gas is still at an elevated pressure, but may be at the temperature of the ambient. After valving 60, in the heating apparatus 58, the gas is raised to an elevated temperature and pressure by burning fuel prior to being used in the adiabatic expansion engine 62. Power ouput from engine 62 is indicated at shaft 64. The exhaust gases from engine 62 are transmitted through conduit 66 to the outer zone of the countercurrent heat exchanger 42, and are cooled as the incoming liquified gas changes to the gaseous state. Accordingly, the exhaust gases at 68 from the engine are relatively cool.

Concerning the unit 58 where additional fuel, such as gasoline is supplied and burned, this may be either an external combustion engine with no chemical interaction with the original liquified gas supplied in the tank 38; or alternatively, the gasoline may be burned with the oxygen present as one component of the liquified air originally supplied in tank 38. However, the heat must be added after closure of valve 60 to insure a constant volume pressure rise as shown by line 24 on FIG. 1. When the internal combustion alternative is employed, it is the inert nitrogen and the combustion products which are then supplied to the adiabatic expansion engine 62.

Figure 3:
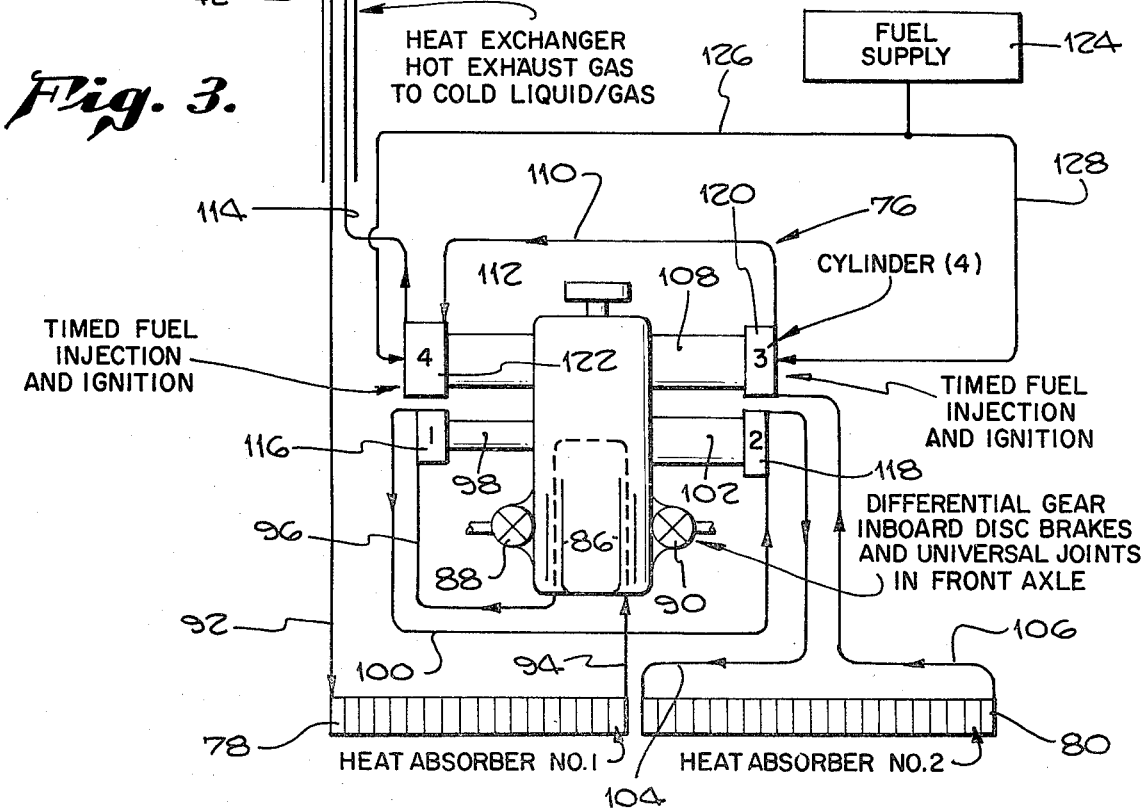
FIG. 3 is a diagrammatic showing of an automotive engine employing liquid air and gasoline fuel injection.

FIGS. 3, 4 and 5 will now be considered together. These three figures are a schematic showing of one illustrative installation of an expansion engine in accordance with the present invention, mounted in a conventional passenger car.

Referring first to FIGS. 4 and 5, the location of the insulated storage tank 38' may suitable be behind the rear seat 72 of the vehicle 74. The high pressure pump 40' and the heat exchanger 42' may be located as indicated in FIGS. 4 and 5 with the high pressure pump immediately adjacent the tank 38', and the heat exchanger 42' extending from the vicinity of the pump 40' in the rear of the vehicle up to the vicinity of the expansion engine 76. The heat exchangers 78 and 80 may suitably be located at the front of the vehicle, generally in the location of conventional automobile radiators. A rear baggage compartment 82 is somewhat reduced in capacity in view of the relatively large size required for the liquid air storage tank 38'; however, the expansion engine 76 is substantially smaller than a conventional automobile engine and a front baggage compartment 84 may therefore also be provided.

Incidentally, the vehicle shown in FIGS. 3, 4, and 5 is provided with a differential gear box 86, and inboard disc brakes 88 and 90, which are cooled by the liquid air flow, thereby picking up all available heat losses in the system—and saving liquified air.

Now, referring to the flow of gas in the schematic showing of FIG. 3, the high pressure air from the countercurrent flow heat exchanger 42' is routed through conduit 92 to the heat absorber unit 78 and then through the conduit 94 through the differential 86 and the disc brakes 88 and 90. The high pressure air is then supplied through conduit 96 to the first stage expansion piston 98. From piston 98, it is routed through the conduit 100 to the second stage expansion piston 102. More ambient heat is absorbed in the heat absorber 80, with the gas path being determined by the conduits 104 and 106, with conduit 106 routing the warmed air to the cylinder 108. At cylinder 108, gasoline or other suitable fuel is injected and burned, raising the temperature of the gas to a level such as 1200° K., prior to expansion in cylinder 108. The output gases from cylinder 108 are routed by the conduit 110 to the final expansion cylinder 112, where additional fuel is added prior to the final extraction of work from the gas. Exhaust gases from cylinder 112 are transmitted to the countercurrent heat exchanger 42' through the conduit 114.

Suitable valving for the timed actuation of the pistons 98, 102, 108, and 112 are included in the units 116, 118, 120 and 122 associated respectively with the cylinders. In addition, the blocks 120 and 122 include suitable fuel injection arrangements to supply diffused gasoline to the air which is to be heated, with the gasoline being provided from the fuel supply 124 over fuel lines 126 and 128.

Figure 6:
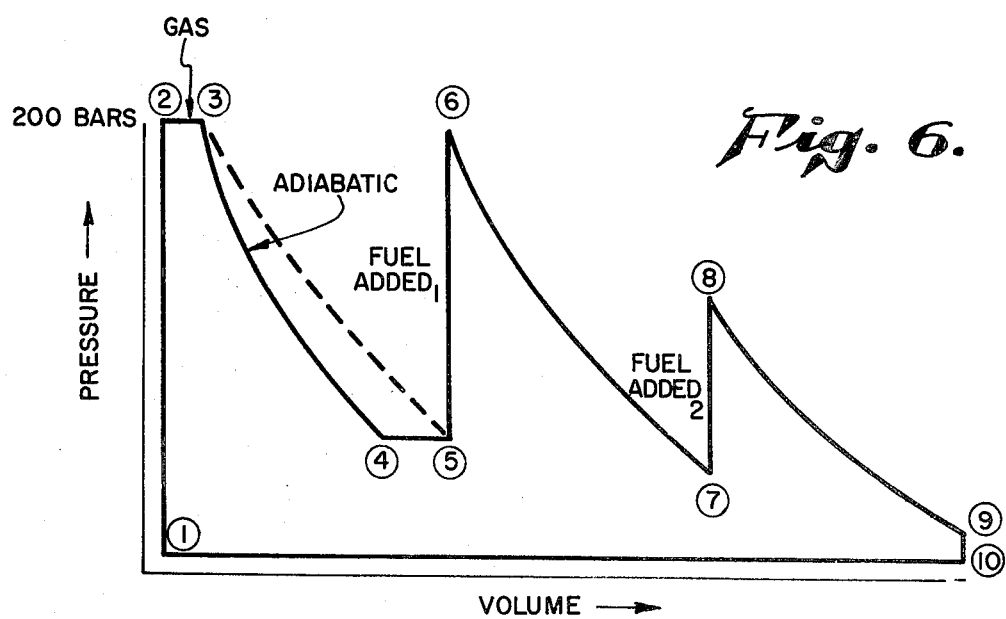
FIG. 6 is a typical pressure-volume diagram for the engine of FIG. 3.

FIG. 6 is a pressure-volume diagram indicating the mode of operation of the engine of FIG. 3. In addition, Table II indicates the pressure, the volume, and the temperature at various points in the engine of FIG. 3, for a typical operating cycle.

In FIG. 6, there are a number of encircled numbers at the break points of the various line and curve segments. These encircled numbers running from "1" to "10" correspond exactly to the "stations", as listed in Table II set forth below. In addition, in Table II, the precise points corresponding to each of the stations are indicated in parenthesis immediately after the station numbers.

TABLE II

| Station | | Pressure Bars | Specific Volume (cc/gm) | Temp. (°K.) |
|---|---|---|---|---|
| 1 | (in tank 38') | 1 | 0.8 | 77° |
| 2 | (output of pump 40') | 200 | 0.8 | 77 |
| 3 | (in conduit 96) | 200 | 6.27 | 400 |
| 4 | (in conduit 104 after cyl. 102) | 50 | 16.78 | 268 |
| 5 | (after heat absorber 80) | 50 | 18.85 | 300 |
| 6, | (after fuel injection 120) | 200 | 18.85 | 1200 |
| 7 | (conduit 110) | 20 | 104 | 659 |
| 8 | (after second fuel injection 122) | 36 | 104 | 1200 |
| 9 | (after expansion cyl. 112) | 5.5 | 416 | 738 |
| 10 | (exhaust) | 1 | 1400 | 450 |

In examining Table II and FIG. 6, it may be noted that the lower left-hand corner of FIG. 6 has the reference numeral "1" which refers to Station 1, representing the conditions in the tank 38', prior to pumping. Then, each successive number represents additional points on the curve of FIG. 6 and additional stations listed in Table II. Particularly interesting features include the fact that Station "6" is at a pressure of approximately 200 atmospheres, which have been employed as a practical upper limit of pressures which can easily be handled, and also is at a temperature of 1200° Kelvin, which was taken as a temperature which could also be readily handled in accordance with known techniques.

In the case of Station "8", the pressure was only raised to approximately 36 bars, in view of reaching the temperature of 1200° K., which has been accepted as the upper limit for the purposes of the present example. It may also be noted that the curve between point "3" and point "4" is actually made up of expansions in cylinder 98 and also cylinder 102. Also, the horizontal section of the plot between points "4" and "5" represents the expansion in the heat absorber 80 shown in FIG. 3. It is believed that the remainder of the information supplied by FIG. 6 and Table II are self-explanatory.

In closing, a number of prior patents showing various expansion engines are listed below at the end of this specification; however, none of these prior patents disclose the supplying of additional fuel to the engine systems to increase the overall power output and efficiency, nor do they disclose the specific advantageous arrangements utilized in accordance with the present invention of supplying gasoline to the air engine and burning this supplemental gasoline in order to greatly increase the efficiency of the engine. The following patents are cited as relating to engines utilizing gas expansion, with many of the cited patents disclosing the use of liquid nitrogen or liquid air.

A rough fuel cost comparison has been made for the engine of the type disclosed herein as compared with conventional standard internal combustion gasoline powered engines. More specifically, assuming that gasoline will soon cost $1.00 a gallon, excluding road tax considerations, and that liquid air will cost approximately 8 cents a gallon when produced in quantity, the propulsive fuel cost of a standard gasoline powered engine will be approximately 3.10 cents per kilometer, or approximately 5 cents per mile, while the cost of the liquid air/gasoline fuel powered engine will be approximately 2.75 cents per kilometer or approximately 4.42 cents per mile.

In Table III set forth below, the weight comparison of a present gasoline auto is compared with that of a cold engine auto, using a full load of fuel. For the purposes of Table III, we are using a full sized American car averaging about 20 miles per gallon of gasoline. On the basis of $4.3 \times 10^{11}$ ergs/gram (18,500 Btu/lb) from the combustion of gasoline, 15% average engine efficiency, about $5.5 \times 10^9$ ergs are required at the engine flywheel for every meter travelled. This average energy requirement has been employed in the calculations for Table III.

The illustrative example of the our engine employing cryogenic and gasoline fuel, delivers $6.0 \times 10^9$ ergs per gram of nitrogen used, to the engine output shaft when the expansion efficiency is 70%. Using these figures, 0.91 kilograms of nitrogen are required for each kilometer which is to be travelled. To ensure a 300 kilometer (186 miles) driving range, about 275 kilograms (101 gallons) of liquid nitrogen is required and 4.2 kilograms (1.5 gallons) of gasoline or equivalent is needed.

The weight comparison is set forth in Table III below:

TABLE III

| Weight Comparison (Full Load of Fuel) | Present Gasoline Auto | Cold Engine Auto |
|---|---|---|
| Engine | 420 kg | 220 kg |
| Heat Exchangers | 50 | 130 |
| Air Conditioner | 50 | Not Required |
| Fuel and Tank | 65 | 7 |
| Liquified gas and container | — | 325 |
| Exhaust | 15 | 10 |
| Total Powerplant System - kg | 600 kg | 692 kg |

In reality, the foregoing comparison is unnecessarily unfavorable as regards the cold engine auto of the present invention. More specifically, on the average, people usually drive with a gas tank or fuel supply which is not more than ⅜ of a tank of gas or other fuel. Using this figure as the average weight of the vehicle, the cold engine auto weight comes down close to that of present automobiles.

In conclusion, it is to be understood that the foregoing description is merely illustrative of the principles of the invention, and that minor modifications are clearly within its scope. Thus, by way of example and not of limitation, instead of a reciprocating type engine, other known forms of engines may be employed. Similarly, the engine is applicable to other types of vehicles and other engines, as well as to automobile engines.

For completeness and as characterized above, the following patents relating to expansion engines using cryogenic fluids, are noted:

U.S. Pat. No. 3,257,806, granted June 28, 1966; U.S. Pat. No. 3,451,342, granted June 24, 1969; U.S. Pat. No. 3,531,933, granted Oct. 6, 1970; U.S. Pat. No. 3,589,126, granted June 29, 1971; U.S. Pat. No. 3,613,385, granted Oct. 19, 1971; U.S. Pat. No. 3,826,096, granted June 30, 1974; U.S. Pat. No. 3,987,632, granted Oct. 26, 1976; and U.S. Pat. No. 3,998,059, granted Dec. 21, 1976.

What is claimed is:

1. An automobile expansion engine system employing a combination of liquid air and combustible fuel as energy sources comprising:
    an insulated storage tank for liquid air;
    means for pumping liquid air from said storage tank to an elevated pressure above 50 bars;
    heat exchanger means coupled to said pump for warming the liquid air toward the ambient to change it to the gaseous state substantially at said elevated pressure;
    expansion engine means, connected to receive air from said heat exchanger means, for permitting said air at high pressure to expand and perform useful work;
    additional heat exchange means for receiving air from said expansion engine means and for further warming the partially expanded air toward the ambient;
    means for supplying combustible fuel to said partially expanded air;
    means for burning said fuel with a part of the oxygen in said partially expanded air and raising the temperature and pressure of said partially expanded air; and
    additional expansion engine means for further expanding said heated air and the associated combustion products and obtaining additional useful work therefrom.

2. A combinational engine system as defined in claim 1 further comprising:
    an automobile;
    means for mounting said liquid air storage tank to the rear of the passenger compartment of said automobile; and
    means for mounting both of said expansion engine means in front of said passenger compartment.

3. A combinational engine system as defined in claim 2 further comprising:
    means for exhausting gases from said additional expansion engine means to the rear of said automobile; and
    countercurrent heat exchange means for heating the liquid air as it is directed forward to the expansion engine means and concurrently cooling the exhaust gases prior to venting them into the atmosphere at the rear of the automobile.

4. A combinational engine system as defined in claim 3 wherein said pump is mounted to the rear of said passenger compartment adjacent said tank.

5. A combinational engine system as defined in claim 2 wherein at least one of said heat exchange means is mounted near the front of said automobile, to be warmed by circulating air encountered as said automobile moves forward.

6. A combinational engine system as defined in claim 1 wherein a second means for burning combustible fuel with at least a portion of the pressurized and partially expanded air is provided, said second means being connected to receive output gases from said additional expansion engine means, and a third expansion engine means is provided for performing useful work with the resultant heated gases, whereby at least two cycles of combination heating by internal combustion and expansion occur.

7. A combinational engine system as defined in claim 1 wherein said pump includes means for pumping said gas to a pressure above 150 bars.

8. A combinational engine system as defined in claim 6 wherein the means for burning combustible fuel includes means for raising the temperature to in the order of 1000° K. to 1400° K.

9. A combinational engine system as defined in claim 6 wherein said means for burning combustible fuel includes means for raising the temperature to in the order of 1100° K. to 1300° K.

10. A combinational engine for operating on liquified cryogenic gas and fuel as energy sources comprising:
- an insulated tank for storing liquified cryogenic gas;
- means for pumping said liquified gas to an elevated pressure above 100 bars;
- heat exchanger means for warming said high pressure liquified gas toward the ambient whereby it changes to the gaseous state;
- multi-stage expansion engine means for receiving said pressurized gas, permitting it to expand, and obtaining useful work therefrom, said multi-stage expansion engine means including at least three stages, the first stage including first expansion engine means for receiving said gas from said heat exchanger and for expanding said air and obtaining useful work therefrom;
- means for supplying combustible fuel to said multi-stage engine;
- first means for burning a portion of said fuel to heat said gas from said first expansion engine means;
- second stage expansion engine means forming part of said multi-stage engine for expanding said heated air and obtaining useful work therefrom;
- second means for burning a portion of said fuel and heating the gases from the output of said second stage; and
- third stage expansion engine means forming part of said multi-stage engine for expanding said heated air from said second burning means and obtaining useful work therefrom;
- whereby the energy in said cold liquified air and that obtained from burning said fuel are uniquely combined to produce more output energy that the sum of each of the two sources of power used separately.

11. A system as defined in claim 16 further comprising:
- an automobile;
- means for mounting said liquid air storage tank to the rear of the passenger compartment of said automobile; and
- means for mounting said expansion engine means in front of said passenger compartment.

12. A system as defined in claim 11 further comprising:
- means for exhausting gases from said expansion engine means to the rear of said automobile; and
- countercurrent fluid heat exchange means for heating the liquid air as it is directed forward to the expansion engine means and concurrently cooling the exhaust gases prior to venting them into the atmosphere at the rear of the automobile.

13. A system as defined in claim 11 wherein a plurality of heat exchangers are included in said heat exchange means and wherein at least one of said heat exchangers is mounted near the front of said automobile, to be warmed by circulating air encountered as said automobile moves forward.

14. A system as defined in claim 10 wherein said pump includes means for pumping said gas to a pressure above 150 bars.

15. A system as defined in claim 10 wherein said means for burning combustible fuel includes means for raising the temperature of the pressurized gas to in the order of 1000° K. to 1400° K.

16. A combinational engine as defined in claim 10 wherein said expansion engine means includes a plurality of piston means for implementing the successive expansion stages.

* * * * *